United States Patent
Broadfield

(10) Patent No.: US 12,350,980 B2
(45) Date of Patent: Jul. 8, 2025

(54) TYRE PRESSURE MONITORING SYSTEM

(71) Applicant: Wheely-Safe Ltd., Staffordshire (GB)

(72) Inventor: Gary Broadfield, Staffordshire (GB)

(73) Assignee: Wheely-Safe Ltd., Burntwood (GB)

( * ) Notice: Subject to any disclaimer, the term of this patent is extended or adjusted under 35 U.S.C. 154(b) by 812 days.

(21) Appl. No.: 17/601,031

(22) PCT Filed: Apr. 2, 2020

(86) PCT No.: PCT/EP2020/059357
§ 371 (c)(1),
(2) Date: Oct. 1, 2021

(87) PCT Pub. No.: WO2020/201402
PCT Pub. Date: Oct. 8, 2020

(65) Prior Publication Data
US 2022/0169083 A1    Jun. 2, 2022

(30) Foreign Application Priority Data
Apr. 2, 2019 (GB) .................................... 1904600

(51) Int. Cl.
*B60C 23/04* (2006.01)
*B60C 23/00* (2006.01)

(52) U.S. Cl.
CPC ........ *B60C 23/0462* (2013.01); *B60C 23/009* (2013.01); *B60C 23/0459* (2013.01);
(Continued)

(58) Field of Classification Search
CPC ............................................... B60C 23/0462
See application file for complete search history.

(56) References Cited

U.S. PATENT DOCUMENTS

| | | |
|---|---|---|
| 2002/0130771 A1* | 9/2002 | Osborne ............... B60C 23/008 340/441 |
| 2003/0080861 A1* | 5/2003 | Okubo ................ B60C 23/0416 340/445 |

(Continued)

FOREIGN PATENT DOCUMENTS

| | | |
|---|---|---|
| EP | 2949485 | 12/2015 |
| JP | 2003223692 | 8/2003 |

(Continued)

OTHER PUBLICATIONS

PCT Search Report for corresponding PCT Application No. PCT/EP2020/059357 dated Jun. 9, 2020, 3 pages.

(Continued)

*Primary Examiner* — Shelley Chen
(74) *Attorney, Agent, or Firm* — Lee & Hayes, P.C.

(57) ABSTRACT

Methods and apparatus for determining whether a vehicle tyre pressure check has been carried out, comprising: receiving from a pressure reader module a request for tyre pressure data indicative of a the pressure of a gas retained within a pneumatic tyre; storing, by a pressure check register, data indicating that the request for tyre pressure data was received; transmitting, by a transmitter to an apparatus, an indication confirming whether a tyre pressure check has been carried out based on whether the request for tyre pressure data was received; receiving, at the apparatus from a plurality of tyre pressure sensing modules, a plurality of indications of whether a tyre pressure reader has been used on each of the plurality of tyre pressure sensing modules to check a corresponding tyre pressure; and determining, by a pressure check confirmer, whether a vehicle tyre pressure check has been carried out based on the received plurality of indications.

17 Claims, 4 Drawing Sheets

(52) U.S. Cl.
CPC ...... *B60C 23/0461* (2013.01); *B60C 23/0479* (2013.01); *B60C 23/0488* (2013.01)

(56) References Cited

U.S. PATENT DOCUMENTS

| | | | | |
|---|---|---|---|---|
| 2003/0227379 | A1* | 12/2003 | Itou | B60C 23/0479 340/442 |
| 2006/0081697 | A1* | 4/2006 | Brinton | G07C 5/008 702/182 |
| 2015/0029016 | A1* | 1/2015 | Lesesky | B60C 23/0486 340/442 |

FOREIGN PATENT DOCUMENTS

| | | | | | |
|---|---|---|---|---|---|
| JP | 2003223692 | A | * | 8/2003 | ......... B60C 23/0416 |
| JP | 2004217212 | A | * | 8/2004 | ......... B60C 23/0416 |
| WO | WO2013152294 | | | 10/2013 | |
| WO | WO-2013152294 | A1 | * | 10/2013 | ........... B60C 23/045 |

OTHER PUBLICATIONS

PCT International Preliminary Report on Patentability for corresponding PCT Application No. PCT/EP2020/059357 dated Oct. 14, 2021, 7 pages.

Combined Search and Examination report for corresponding GB Application No. GB1904600.2 dated Aug. 21, 2019, 9 pages.

* cited by examiner

TYRE PRESSURE MONITORING SYSTEM

This Application is the US National Stage entry under 35 U.S.C. 371 of International application PCT/EP2020/059357 filed 2 Apr. 2020, which claims priority to Great Britain application 1904600.2, filed 2 Apr. 2019, which is incorporated herein by reference.

TECHNICAL FIELD

The invention relates to tyre pressure monitoring systems. In particular, the invention may relate to retro-fit (or after sales) tyre pressure monitoring systems.

BACKGROUND

Tyre pressure monitoring systems (TPMS) typically comprise large and cumbersome sensing modules that must be fitted to a pneumatic tyre of a vehicle. In addition, a driver indicator unit is installed in the vehicle for notifying the driver of the pressures of gas retained in the pneumatic tyres (the tyre pressures).

In such systems, the sensing modules are configured to transmit an absolute value for the tyre pressure of each pneumatic tyre to the driver indicator unit. The driver indicator unit then displays the tyre pressures to the driver. The driver indicator unit also determines whether the tyre pressures are within limits set by one or more tyre parameters and informs the driver if that is not the case. The driver indicator unit therefore requires programming in order to determine the tyre parameters. Typically, this may require a user or fitter of the system to program into the driver indicator unit a number of pressure values based on, for example, the vehicle type, the tyre type, the location of the tyre on the vehicle, the tyre high and low pressure limits, etc. This is complicated, time consuming and is prone to error.

It is a requirement for drivers of fleet vehicles, such as vans, lorries and buses to check tyre pressures daily and before use of a vehicle. Ensuring that such checks are carried out involves significant burden and risk for fleet vehicle operating companies.

SUMMARY

According to an aspect of the invention, there is provided a tyre pressure sensing module for fitting to a wheel of a vehicle comprising a pneumatic tyre, the sensing module comprising: a pressure sensor for sensing a pressure of a gas retained within the pneumatic tyre; a receiver configured to receive, from a user module, data indicating that the user module is proximal to the tyre pressure sensor; a transmitter configured to transmit to an apparatus, data indicating that the user module has been proximal to the tyre pressure sensor.

Use of the tyre pressure sensing module for determination of completion of a walk around check provides the ability to use an existing sensor arrangement to provide an additional benefit. Tyres of a vehicle are typically located at the corners of the vehicle and if a user visits tyre pressure sensing modules located at the corners of the vehicle, this can be considered a proxy for completion of a walk around check.

Optionally, the user module is proximal to the tyre pressure sensor when it is less than 50 cm away from the tyre pressure sensor, less than 25 cm away from the tyre pressure sensor; less than 10 cm away from the tyre pressure sensor, less than 5 cm away from the tyre pressure sensor or less than 2 cm away from the tyre pressure sensor.

Optionally, the user module comprises a pressure reader module, and wherein the receiver is configured to receive, from the pressure reader module, a request for tyre pressure data indicative of a the pressure of the gas retained within the pneumatic tyre, the tyre pressure sensor further comprising a pressure check register configured to store data indicating that the request for tyre pressure data was received, wherein the transmitter is configured to transmit to the apparatus, an indication confirming whether a tyre pressure check has been carried out based on whether the request for tyre pressure data was received.

Optionally, the transmitter is further configured to transmit the requested tyre pressure data to the pressure reader module.

Optionally, the tyre pressure sensing module is further configured to poll the pressure check register to determine whether tyre pressure data has been requested.

Optionally, the tyre pressure sensing module is further comprising a motion sensor configured to determine whether the wheel is rotating.

Optionally, the transmitter is configured to transmit the indication in dependence on the motion sensor determining that the wheel is rotating.

Optionally, the transmitter is configured to send a positive indication that the pressure reader module has been used if the request for tyre pressure data was received.

Optionally, the transmitter is configured to send a negative indication that the pressure reader module has been used if the request for tyre pressure data was not received.

Optionally, the transmitter is further configured to transmit, to the apparatus, tyre pressure data indicative of a the pressure of the gas retained within the pneumatic tyre.

Optionally, the apparatus comprises the user module and wherein the transmitted data indicating that the user module has been proximal to the tyre pressure sensor is configured to be forwarded to a further apparatus.

According to an aspect of the invention, there is provided an apparatus for use with a plurality of tyre pressure sensing modules, comprising: a receiver configured to receive, from a plurality of tyre pressure sensing modules, a plurality of indications of whether a user module has been proximal to each of the plurality of tyre pressure sensing modules; and a walk around check confirmer configured to determine whether a vehicle walk around check has been carried out based on the received plurality of indications.

Optionally, the user module comprises a pressure reader module and the plurality of indications indicate that the pressure reader module has been used on each of the plurality of tyre pressure sensing modules to check a corresponding tyre pressure, and wherein the walk around check confirmer comprises a pressure check confirmer configured to determine that a vehicle tyre pressure check has been carried out if all of the received indications are positive indications that the pressure reader module has been used.

Optionally, the plurality of received indications includes indications from all tyre pressure sensing modules fitted to a vehicle.

Optionally, the pressure check confirmer is configured to determine that the vehicle tyre pressure check has not been carried out if one or more of the received indications are negative indications that the pressure reader module has not been used.

Optionally, the apparatus comprises on of a driver indicator unit and a user equipment.

Optionally, the apparatus further comprises a transmitter configured to transmit data confirming whether the walk around check has been carried out.

Optionally, if the apparatus comprises a the driver indicator unit, the transmitter is configured to transmit data confirming whether the walk around check has been carried out to a server connected to a network, and wherein if the apparatus comprises a user equipment, the transmitter is configured to transmit data confirming whether the walk around check has been carried out to a driver indicator unit and/or a server connected to a network.

Optionally, the walk around check confirmer is configured to control immobilisation of the vehicle based on the received plurality of indications.

According to an aspect of the invention, there is provided a tyre pressure monitoring system for fitting to a vehicle, comprising a plurality of tyre pressure sensing modules according to any described herein and particularly above, and an apparatus according to any described herein and particularly above.

Optionally, the tyre pressure monitoring system further comprises a pressure reader module and/or a user module.

According to an aspect of the invention, there is provided a vehicle comprising a tyre pressure monitoring system according to any described herein and particularly above.

According to an aspect of the invention, there is provided a method for determining whether a vehicle walk around check has been carried out, the method comprising: receiving, by a receiver from a user module, data indicating that the user module is proximal to the tyre pressure sensor; and transmitting, by a transmitter to an apparatus, data indicating that the user module has been proximal to the tyre pressure sensor.

According to an aspect of the invention, there is provided a method for determining whether a vehicle walk around check has been carried out, the method comprising: receiving, by a receiver and from a plurality of tyre pressure sensing modules, a plurality of indications of whether a user module has been proximal to each of the plurality of tyre pressure sensing modules; and determining, by a walk around check confirmer, whether a vehicle walk around check has been carried out based on the received plurality of indications.

According to an aspect of the invention, there is provided a computer program comprising instructions which, when executed on at least one processor, cause the at least one processor to carry out any method any described herein and particularly above.

BRIEF DESCRIPTION OF THE FIGURES

Exemplary methods and apparatus are described herein with reference to the accompanying drawings, in which.

DETAILED DESCRIPTION

Figure 1:
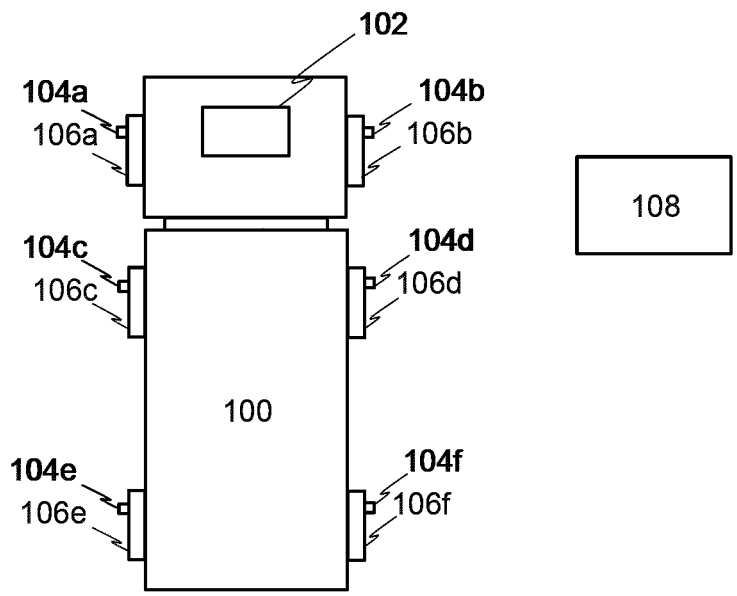
FIG. 1 is a schematic diagram of a TPMS.

Generally, disclosed herein are tyre pressure sensing modules and driver indicator units that may form part of a TPMS. Exemplary sensing modules disclosed are configured not to transmit absolute tyre pressure values to the driver indicator unit, but to transmit alert signals notifying the driver indicator unit that a value related to the tyre pressure of a wheel is not within limits set by one or more tyre parameters. That is, in exemplary arrangements, the sensing module is configured to determine whether the value related to the tyre pressure is within the tyre parameters, rather than the driver indicator unit.

The inventor has appreciated that by moving the determination of whether to generate an alert signal from the indicator unit to the sensing module, less data is required to be transmitted and the frequency with which data is to be transmitted from the sensing module to the driver indicator unit is greatly reduced. The sensing module only needs to transmit an alert signal when an alarm is necessary, which can be much simpler and more data efficient than transmitting an absolute tyre pressure value, which other systems typically send every five minutes continuously. This provides benefits in terms of reduced power consumption, which allows the battery of the sensing unit to be smaller for a given time sensing module battery life, reducing the need for replacement batteries, complicated instructions and structures for battery exchange, and enabling a low cost permanently sealed solution. This also has the added benefit of a lightweight sensing module which reduces stresses on the valve stem and prevents any possibility of effecting the wheel balance. Finally, a smaller sensing module is less conspicuous and therefore less liable to be targeted for theft.

In addition, the inventor has appreciated that by moving the determination of alert signals to the sensing module, the burden of programming the driver indicator unit may be removed. Exemplary sensing units may be configured to self-calibrate based on a tyre pressure sensed at the time of fitting the sensing module. The one or more tyre parameters may be calculated by the sensing unit based on the initial sensed pressure.

Further, the inventor has appreciated that it is desirable to ensure that a driver or other operative has completed a walk-around check of a vehicle before use. Such checks may be completed daily, for example. A walk-around check may include a check of the tyre pressures of a vehicle. Wheels are typically located at all corners of the vehicle and it is therefore necessary to walk around the vehicle to check the tyre pressures. In this way, confirmation of tyre pressure checks may be used as a proxy for confirmation that a walk-around check has been completed. More broadly, confirmation that a user, or specifically a user module (which may be a pressure reader module), has been proximal to a tyre pressure sensing module may be used as a proxy for confirmation that a walk-around check has been completed.

FIG. 1 shows a schematic diagram of a TPMS fitted to a vehicle 100. The TPMS includes a driver indicator unit 102 and a plurality of tyre pressure sensing modules 104a-f. The driver indicator unit 102 is fitted within the vehicle and in view of the driver. Each of the sensing modules 104a-f is fitted to a wheel 106a-f of the vehicle 100 and each wheel 106a-f comprises a pneumatic tyre. The sensing modules 104a-f are configured to sense a tyre pressure of a corresponding pneumatic tyre, as explained in greater detail below. Each of the sensing modules 104a-f is also configured to determine whether an alert signal should be transmitted to the driver indicator unit 102 based on the sensed tyre pressure.

The vehicle 100 of FIG. 1 is a lorry or other goods vehicle, but it will be appreciated that the TPMS and any components thereof may be fitted to any type of vehicle, including towed vehicles, having at least one pneumatic tyre.

Figure 2:
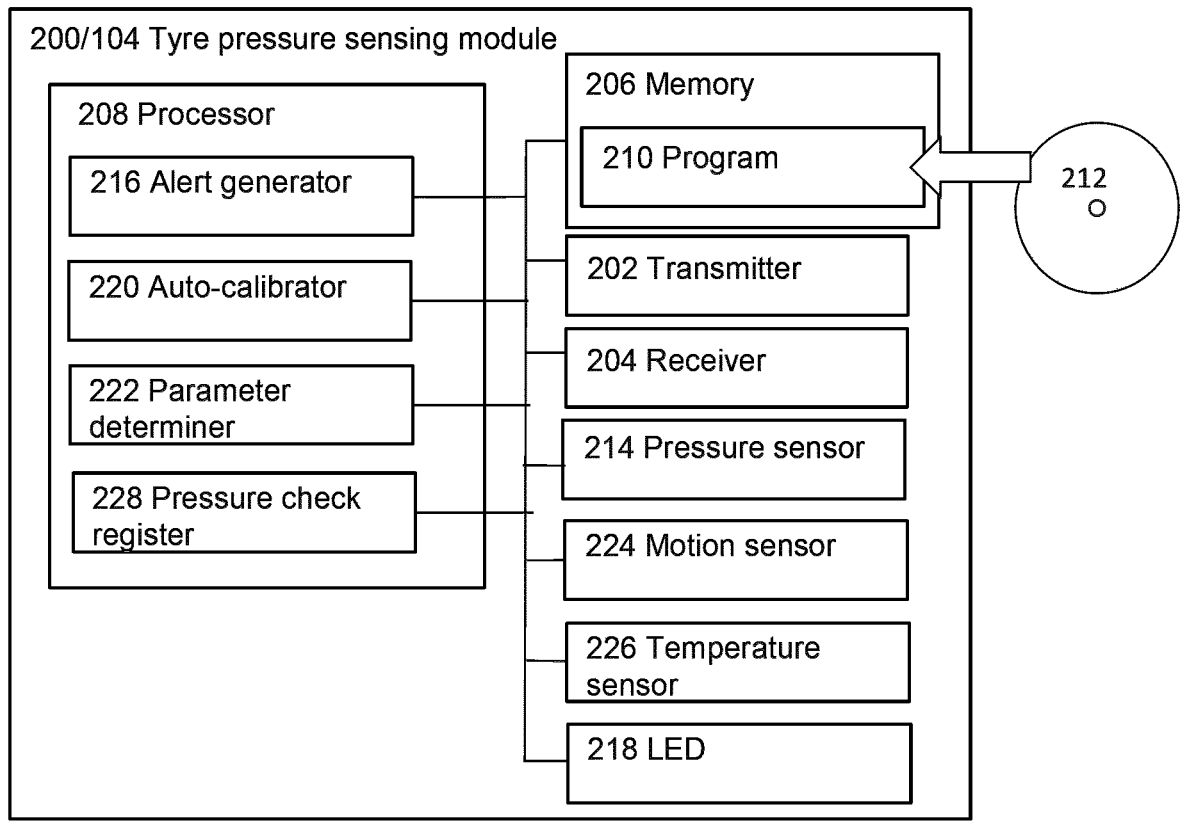
FIG. 2 is a schematic diagram of a tyre pressure sensing module.

FIG. 2 shows a schematic representation of a tyre pressure sensing module 200, which may be a sensing module 104a-f shown in FIG. 1. The sensing module 200 comprises a transmitter 202 and a receiver 204. The transmitter 202 and receiver 204 may be in data communication with other entities in a TPMS, such as driver indicator unit 102, servers and/or functions in a telecommunications network and is configured to transmit data accordingly.

The sensing module 200 further comprises a memory 206 and a processor 208. The memory 206 may comprise a non-volatile memory and/or a volatile memory. The memory 206 may have a computer program 210 stored therein. The computer program 210 may be configured to undertake the methods disclosed herein. The computer program 210 may be loaded in the memory 206 from a non-transitory computer readable medium 212, on which the computer program is stored. The processor 208 is configured to undertake one or more of the functions of an alert generator 216, an auto-calibrator 220, a parameter determiner 222 and a pressure check register (or in some arrangements walk-around check register) 228, as set out below. The sensing module 200 also comprises a pressure sensor 214, an LED 218, a motion sensor 224 and temperature sensor 226 and the processor may be configured to control one or more of these features.

Each of the transmitter 202, receiver 204, memory 206, processor 208, pressure sensor 214, alert generator 216, LED 218, auto-calibrator 220, parameter determiner 222, motion sensor 224, temperature sensor 226 and/or pressure check register 228 is in data communication with the other features 202, 204 206, 208, 210, 214, 216, 218, 220, 222, 224, 226, 228 of the sensing module 200. The sensing module 200 can be implemented as a combination of computer hardware and software. In particular, the alert generator 216, auto-calibrator 220, parameter determiner 222 and/or pressure check register 228 may be implemented as software configured to run on the processor 208. The memory 206 stores the various programs/executable files that are implemented by a processor 208, and also provides a storage unit for any required data. The programs/executable files stored in the memory 206, and implemented by the processor 208, can include the alert generator 216, auto-calibrator 220, parameter determiner 222 and/or pressure check register 228, but are not limited to such.

Figure 3:
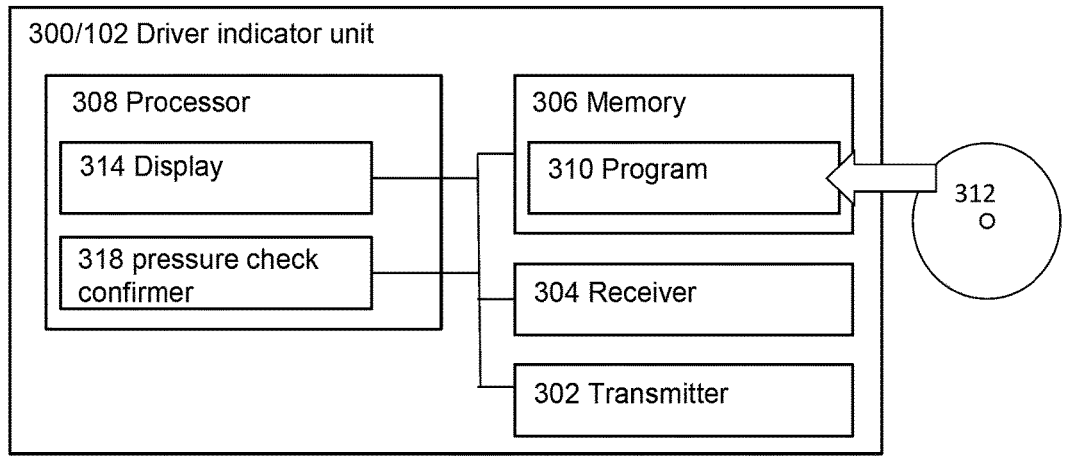
FIG. 3 is a schematic diagram of a driver indicator unit.

FIG. 3 shows a schematic representation of a driver indicator unit 300, which may be a driver indicator unit 102 shown in FIG. 1. The driver indicator unit 300 comprises a receiver 304 and may also comprise a transmitter 302. The transmitter 302 and receiver 304 may be in data communication with other entities in a TPMS, such as sensing modules 104a-f, servers and/or functions in a telecommunications network and are configured to transmit and receive data accordingly.

The driver indicator unit 300 further comprises a memory 306, a processor 308 and a display 316. The memory 306 may comprise a non-volatile memory and/or a volatile memory. The memory 306 may have a computer program 310 stored therein. The computer program 310 may be configured to undertake the methods disclosed herein. The computer program 310 may be loaded in the memory 306 from a non-transitory computer readable medium 312, on which the computer program is stored. The processor 308 is configured to undertake one or more of the functions of a display generator 314 and a pressure check confirmer (or in some arrangements a walk-around check confirmer) 318, as set out below.

Each of the transmitter 302 and receiver 304, memory 306, processor 308 display generator 314, display 316 and/or pressure check confirmer 318 is in data communication with the other features 302, 304, 306, 308, 310, 314, 316, 318 of the driver indicator unit 300. The driver indicator unit 300 can be implemented as a combination of computer hardware and software. In particular, the display generator 314 and/or pressure check confirmer 318 may be implemented as software configured to run on the processor 308. The memory 306 stores the various programs/executable files that are implemented by a processor 308, and also provides a storage unit for any required data. The programs/executable files stored in the memory 306, and implemented by the processor 308, can include the display generator 314 and/or the pressure check confirmer 318, but are not limited to such.

Figure 4:
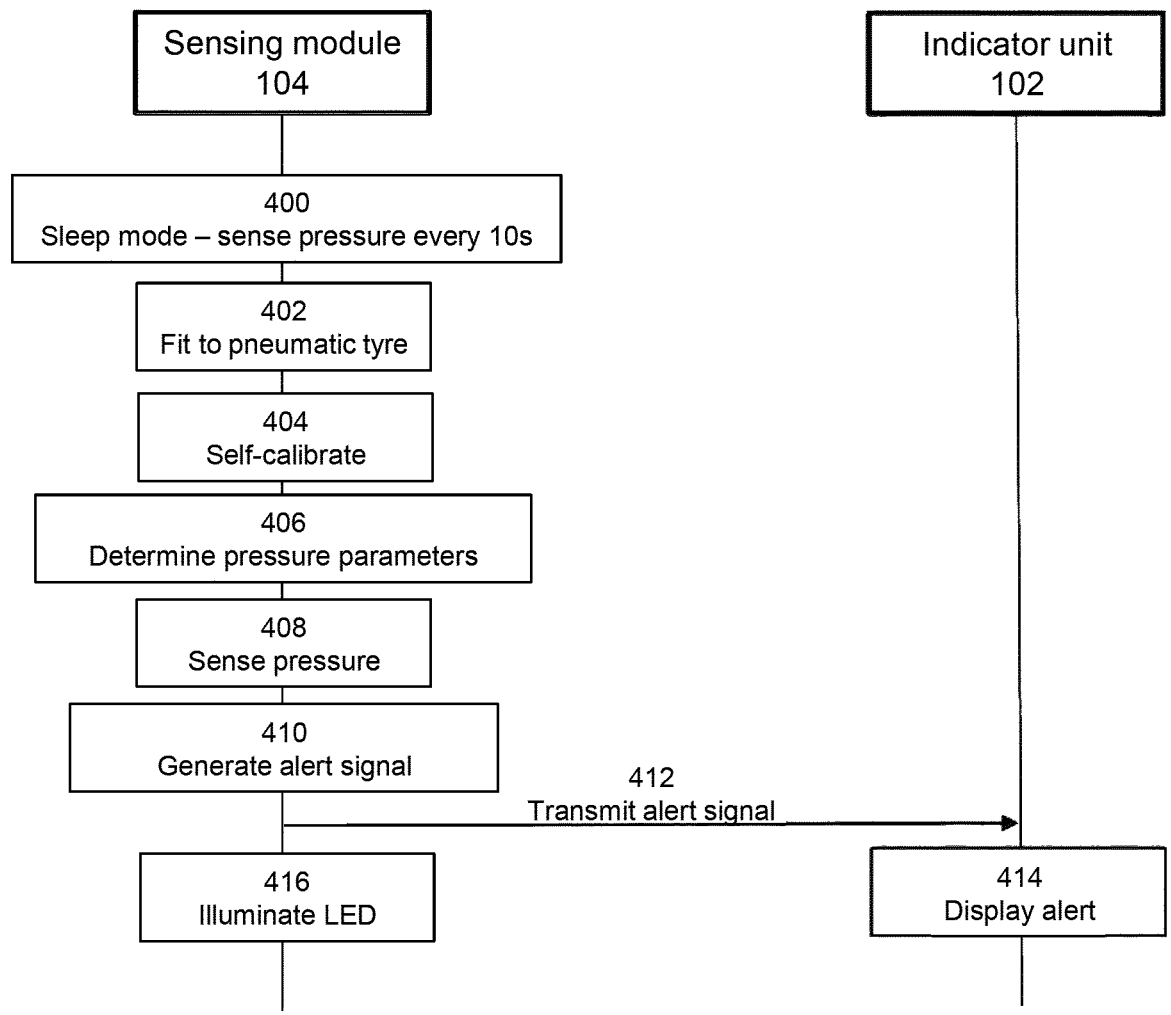
FIG. 4 is a process flow diagram showing a method for monitoring tyre pressures of a vehicle.

FIG. 4 shows a flow chart for a method for monitoring tyre pressure. After a sensing module 104a-f is manufactured, it is in a sleep mode 400 during which the pressure sensor 214 senses the pressure to which the sensing module is exposed at predefined intervals. In exemplary arrangements, the interval may be in a range from 5 seconds to 30 seconds and in a specific arrangement may be 10 seconds. While the sensing module is not fitted to a pneumatic tyre, the pressure sensor 214 will sense atmospheric pressure. The sensing module 104a-f is configured to remain in sleep mode if the pressure sensor 214 senses atmospheric pressure.

Before fitting the sensing module 104a-f to a tyre, the tyre should be inflated to the correct pressure. Then, the sensing module 104a-f is fitted to the tyre 402 and after completion of the next interval period, the pressure sensor 214 senses the pressure of the gas retained within the tyre. This will be a pressure significantly greater than atmospheric pressure, for example, around 35 pounds per square inch (approximately 2.41 Bar). The auto-calibrator 220 is configured to calibrate 404 the sensing unit 104a-f in response to the pressure sensor 214 detecting the first pressure that is greater than atmospheric pressure, that is, the first time that a tyre pressure is sensed.

The sensing module 104a-f may comprise a fitment that is configured to allow the sensing module 104a-f to be fitted to a valve of the pneumatic tyre of each wheel. The valve may be a Schrader type valve and may comprise a screw thread. Therefore, the sensing module 104a-f may comprise a corresponding screw thread permitting the sensing module 104a-f to be screwed onto the valve. The fitment may also comprise a valve actuator configured to interact with the valve when the sensing module 104a-f is fitted to allow gas from within the tyre to enter the pressure sensor 214. In this way the pressure sensor 214 is able to sense the pressure of the gas within the tyre.

Because the tyre has been inflated to the correct pressure before fitting the sensing module 104a-f, the initial pressure sensed by the pressure sensor after fitting is used to calibrate the sensing module 104a-f. The auto-calibrator 216 calibrates 404 the sensing module 104a-f by setting a calibrated pressure to be the initially sensed tyre pressure.

The calibrated pressure may remain the same until the sensing module 104a-f is removed from the tyre and the pressure sensor 214 senses atmospheric pressure again, after which the sensing module 104a-f is reset and enters sleep mode once again. The reset may be configured to occur when the journey has ended and the pressure sensor 214 senses atmospheric pressure. If the pressure sensor 214 senses atmospheric pressure during a journey then this may indicate a blowout.

Once the sensing module 104a-f has been fitted to the tyre and has been calibrated, the LED 218, or another visual indicator, is configured to illuminate, for example by flashing a predetermined number of times. This provides a visual indication that the sensing module is operational and has sufficient battery life, without the need to transmit any data to the driver indicator unit 102. In addition, this feature can be used as a sensor check on a vehicle, trailer, caravan etc. that has not been used for a long time. By removing and refitting the sensing module 104a-f, if the user observes the illuminated LED then they can have confidence that the sensor is still working.

Of course, in other exemplary arrangements, the calibrated pressure may be predetermined and programmed into the sensing module 104a-f during manufacture.

The sensing module 104a-f may then undergo a pairing procedure to register the sensing module 104a-f with the driver indicator unit 102. This pairing may be done in a number of ways.

The parameter determiner 222 determines 406 a plurality of tyre parameters that may be used by the alert generator 216 to determine whether an alert signal should be transmitted to the driver indicator unit 102. The parameter determiner 222 may be configured to determine at least the following tyre parameters:

High/low pressure parameter: this is a pressure that is greater than or less than the calibrated pressure by a given percentage, for example, in a range from 20%-30% greater than or less than the calibrated pressure. In a specific exemplary arrangement, the high/low pressure parameter is 25% greater than or less than the calibrated pressure. It is noted that the high and low pressure parameters may be separate parameters and/or may identify a range of pressures outside which a pressure alert (such as a high or low pressure alert) may be determined.

Very high/low pressure parameter: this is a pressure that is greater than or less than the calibrated pressure by a given percentage, which is greater than the percentage for the high/low pressure parameter. For example, the very high/low pressure parameter may be in a range from 30% (or just over) to 40% greater than or less than the calibrated pressure. In a specific exemplary arrangement, the very high/low pressure parameter is 35% greater than or less than the calibrated pressure. It is noted that the very high and very low pressure parameters may be separate parameters and/or may identify a range of pressures outside which a severe pressure alert (such as a very high or very low pressure alert) may be determined.

Leakage parameter: this is a rate of change of tyre pressure that is greater than a rate threshold. In exemplary arrangements, the rate threshold may be in a range from 2% to 4% of the calibrated pressure per minute and may specifically be 3% of the calibrated pressure per minute.

Blowout parameter: this is a rate of change of tyre pressure that results in a deflation from calibrated pressure to substantially atmospheric pressure in a time less than a blowout threshold. For example, the blowout threshold time may be in a range from 1 second to 4 seconds and may specifically be 3 seconds.

The high/low and very high/low pressure parameters may collectively be termed pressure parameters. The leakage parameter and the blowout parameter may collectively be termed rate parameters.

The pressure sensor 214 senses 408 the tyre pressure at intervals, for example every 10 seconds. The alert generator 216 compares the sensed pressure with the determined tyre parameters and determines whether an alert signal should be transmitted based on the result of that comparison. It is noted that in order to assess the sensed pressure against the rate parameters, one or more previously sensed pressures must also be used. These may be stored in the memory 206.

If the sensed pressure or rate of change of pressure is not outside one or more of the determined parameters then no alert is generated and the tyre pressure is sensed again by the pressure sensor 214 after the next interval period. If the alert generator 216 determines that the sensed pressure or rate of change of pressure are outside one or more of the tyre parameters then the alert generator 216 generates 410 an alert signal and the transmitter 202 transmits 412 the alert signal to the driver indicator unit 102.

The driver indicator unit receives the alert signal and the display generator 314 controls the display 316 to display 414 the alert to the driver. It is noted again that the driver indicator unit 102 does not receive an absolute value for the tyre pressure. Further, the driver indicator unit 102 does not store any information on what the calibrated pressure is (i.e. the correct pressure for the tyre) or what any of the tyre parameters are. The driver indicator unit 102 merely receives an alert signal and makes a corresponding indication to the driver. This reduces considerably the power consumption of the driver indicator unit 102 as large LCD screens are not necessary and allows the use of a solar panel to provide electrical power rather than having to connect the driver indicator unit 102 to an internal vehicle power source. Therefore, the driver indicator unit may comprise a solar panel on an upper surface thereof. The upper surface of the driver indicator unit 102 may also comprise an adhesive or other securing means for retaining the sensing module against the windscreen of the vehicle. In exemplary methods and apparatus, the driver indicator unit 102 may require $\frac{1}{20}^{th}$ the electrical power of a typical unit in known systems.

In the case of a high/low pressure alert, the alert generator 216 generates the alert if the sensed pressure is greater than or less than the calibrated pressure by more than the percentages mentioned above (e.g. 25%). The high/low pressure alert signal may be transmitted by the transmitter 202 to the driver indicator unit 102 every 5 seconds for 90 seconds. The pressure alert signal is transmitted immediately upon determining that the sensed pressure is high/low and is transmitted in multiple frames, ensuring that the risk of transmission loss is all but eliminated. This high rate of transmission and immediate pressure alert transmissions may be favourably compared to known TPMSs, which may transmit typically just a one or two frames of pressure value and sensor ID once every 5 minutes or so. Exemplary methods and apparatus ensure that the driver is alerted quickly and with a high confidence that the alert will be received by the driver indicator unit 102.

Known after sale (or retro-fit) TPMSs typically display the actual tyre pressure as a key feature. This means that the sensing module needs to update the driver indicator unit continually. Consequently, to reduce the power consumption of this regular transmission, only one or two frames is typically transmitted every five minutes and the actual tyre pressure is displayed by the driver indicator unit. For high and low pressure the driver indicator unit computes whether to alert the driver or not. This continual sending and updating of actual tyre pressure by the sensing module is energy consuming and hence the battery life is greatly reduced. There is also a high risk of delay of the transmission of the alert signal due to the time gap of 5 minutes. More seriously, due to the relative lack of robustness of sending the alert signal in just one or two frames, a major concern is that an excess of 10 or 15 minutes may pass before the receiver of the driver indicator unit adequately receives the data necessary to signal an alert to the driver to take evasive action.

Therefore, in exemplary arrangements disclosed herein, the sensing module 104 transmits the alert signal only when the sensed pressure is determined to be not aligned with one of the tyre pressure parameters, for example when the sensed pressure is determined to be high or low. When the sensed pressure is aligned with the tyre pressure parameters, the sensing module 104 may be configured not to transmit any data indicating what the sensed pressure is to the driver indicator unit 102.

In conclusion, the further merits of allowing the sensing module 104 to compute the alert signal, combined with the realisation that displaying the actual tyre pressure at the driver indicator unit 102 is unnecessary, results in a more responsive, multiple-frame and concentrated alert signal which greatly improves the overall system safety.

In the case of a very high/low pressure alert, the alert generator 216 generates the alert if the sensed pressure is greater than or less than the calibrated pressure by more than the percentages mentioned above (e.g. 35%). The very high/low pressure alert signal may be transmitted by the transmitter 202 to the driver indicator unit 102 every 5 seconds continuously for the remainder of the journey.

In the case of a leakage alert, the alert generator 216 generates the alert if the rate of change of the sensed pressure is greater than a specific percentage (e.g. 3%) of the calibrated pressure within a specific period of time (e.g. one minute). The leakage alert signal may be transmitted by the transmitter 202 to the driver indicator unit 102 every 5 seconds continuously until the problem is resolved, for example by removal of the sensing module 104a-f from the tyre in question.

In the case of a blowout alert, the alert generator 216 generates the alert if the rate of change of the sensed pressure is greater than a rate associated with a drop from calibrated pressure to substantially atmospheric pressure within a specific period of time (e.g. 3 seconds). The blowout alert signal may be transmitted by the transmitter 202 to the driver indicator unit 102 every 5 seconds continuously until one of the following conditions occurs:

The motion sensor 224 detects that the vehicle 100 has stopped, and the sensing module 104a-f has become stationary for one minute or more. After one minute stationary the sensing module 104a-f will stop sending the blowout alert signal. At this point the sensing module 104a-f will go into sleep mode ready for re-fitting and re-calibration; and/or The sensor pressure suddenly increases from substantially atmospheric pressure (approx. 1 bar) to 1.2 Bar (17.4 psi) or more. The reason for this is that the removal of a sensor for re-inflation may be mistaken as a blowout so by re-fitting a sensor after inflation, re-attaching the sensor will reset the blowout and lead to self-calibration.

In addition to the transmitted alert signal, the LED 218 may also illuminate 416 to indicate the sensing module 104a-f that has generated the alert signal. In exemplary arrangements, the colour and/or pattern (e.g. flashing rate) of the LED 218 may indicate the type of alert generated by the alert generator 216 of the sensing module 104a-f.

In exemplary arrangements, the sensing module 104a-f includes a motion sensor 224, such as an accelerometer. The motion sensor 224 may be configured to detect when the vehicle 100 has stopped, for example if there is no detected motion for a specific period of time, such as 10 seconds or more. If the alert generator has generated an alert during the journey (i.e. before the motion sensor 224 detects that the journey has ended) then the LED 218 may be configured to illuminate when the motion sensor 224 detects that the vehicle 100 has stopped. In exemplary arrangements, the LED 218 may flash every 5 seconds for 2 minutes. The illumination of the LED 218 may end when the motion sensor 224 detects that the vehicle 100 has started moving again. The LED may be configured to illuminate for a maximum number of vehicle stops, e.g. 5, in the same journey. If the sensing module 104a-f is not removed during the maximum number of stops then the LED 218 ceases to illuminate when the vehicle 100 stops in order to preserve battery life.

The motion sensor 224 may also detect the end of the journey by detecting no vehicle motion for at least a journey end period, e.g. 15 minutes. Movement after no vehicle motion for at least the journey end period signifies the start of a new journey. If a new journey starts and the tyre error is still the same for the sensing module 104a-f, then the LED 218 will repeat the above procedure for the maximum number of vehicle stops.

It is noted that journey end results in the tyre sensing module going into sleep mode. In sleep mode the tyre sensing module just has continual sensor monitoring of tyre pressure, NFC (Near Field Communication) and acceleration (needed to detect movement for wake up). Other systems, even when the vehicle is stationary, typically send actual tyre pressure data every five minutes continuously resulting in excessive and unnecessary battery drain.

The sensing module may also comprise a temperature sensor 226 configured to detect the temperature of the gas retained within the tyre. Accordingly, the parameter determiner 222 may be further configured to determine a temperature parameter or a temperature parameter may be programmed into the sensing module 104a-f during manufacture. The temperature parameter is a temperature threshold above which the alert generator 216 will generate a temperature alert. In exemplary arrangements, the temperature threshold may be in a range from 90 degrees to 110 degrees and may specifically be 100 degrees. If the sensed temperature exceeds the threshold temperature then the alert generator 216 generates the temperature alert signal and the transmitter 202 transmits the temperature alert signal to the driver indicator unit 102. The transmitter 202 may transmit the temperature alert signal once every 5 seconds for 90 seconds or until the temperature drops below the threshold temperature.

In specific arrangements, the sensing module may be part of a retro-fit (or after sales) TPMS.

Figure 5:
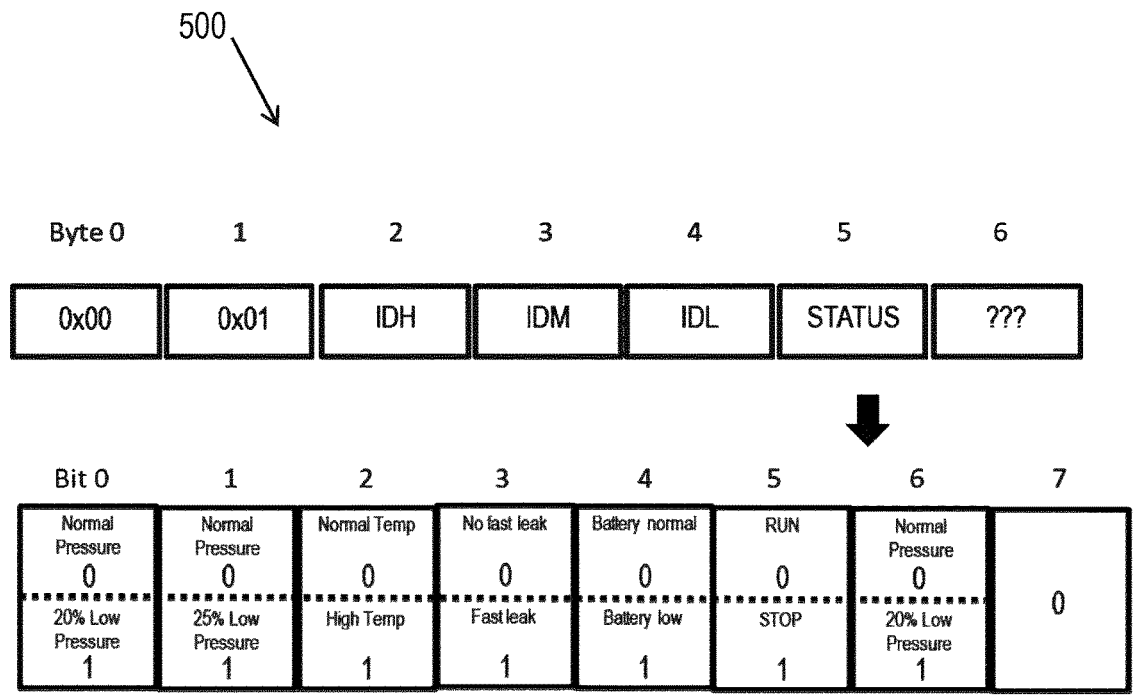
FIG. 5 shows an exemplary alert signal data packet.

FIG. 5 shows an exemplary alert signal data packet 500 comprising 7 bytes of data (bytes 0-6). Byte 5 is shown as comprising status information, which in the exemplary arrangement of FIG. 5 is information relating to the sensor and/or the sensed pressure of the gas inside the pneumatic tyre. Byte 5 is expanded below the alert signal data packet 500 to show the data conveyed by each bit. The data relating to each bit of byte 5 is identified below.

Bit 0: 20% low pressure indicator. Bit 0 will be a "0" when the pressure of the gas in the tyre is greater than 80% of the initial sensed pressure and becomes a "1" if the sensed pressure falls below 80% of the initial sensed pressure.

Bit 1: 25% low pressure indicator. Bit 1 will be a "0" when the pressure of the gas in the tyre is greater than 75% of the initial sensed pressure and becomes a "1" if the sensed pressure falls below 75% of the initial sensed pressure.

Bit 2: high temperature indicator. Bit 2 will be a "0" if the sensed temperature is less than a high temperature threshold and becomes a "1" if the sensed temperature rises above the high temperature threshold.

Bit 3: blowout indicator. If a blowout is detected using any method disclosed herein (or any other method), bit 3 will become a "1".

Bit 4: battery indicator. Bit 4 will be a "0" when the battery charge is greater than a battery threshold value and becomes a "1" if the battery charge falls below the battery threshold value.

Bit 5: run/stop indicator.

Bit 6: 20% low pressure indicator.

Bit 7: spare. Bit 7 may be a spare bit that can be used to convey data not conveyed by the other bits of byte 5. In the example of FIG. 5, bit 7 is a "0".

In exemplary arrangements, the TPMS of FIG. 1 may further comprise a pressure reader module or user module 108. However, it is noted that the pressure reader module or user module 108 may be used with tyre pressure sensing modules from any TPMS system and not just the system described above. The embodiments described below relating to confirmation of walk-around and/or pressure checks may therefore be construed broadly to apply to any TPMS that comprises one or more wheel based tyre pressure sensing modules in communication with an apparatus, such as a driver indicator unit.

The following description relates to one embodiment in which the user module comprises a pressure reader module. In further arrangements, the user module may comprise a mobile phone, and the below description may also apply to such arrangements. As explained in more detail below, a user of the system may walk around the vehicle 100 with the pressure reader module 108. The user may hold the reader module 108 in close proximity to one or more of the tyre pressure sensing modules 104*a-f* in turn. When the reader module 108 is in close proximity to the sensing modules 104*a-f*, it may transmit a signal that activates one or more components of a sensing module 104*a-f*. The signal may form part of a request for tyre pressure data. The sensing module 104*a-f* receives the request at the receiver 204 and then determines the pressure of the air in the tyre of the wheel 106*a-f*, and optionally transmits it to the pressure reader module 108. In other arrangements, the sensing module 104*a-f* may display the tyre pressure. The activated components may then switch off again. In some exemplary arrangements, the pressure reader module 108 receives data transmitted by the sensing module 104*a-f* and displays the tyre pressure on a display. The data may comprise one or more of: the value of the sensed pressure, a time stamp indicating the time that the sensing module received the signal from the pressure reader module to activate the one or more components of the sensing module, a time stamp indicating the time that the sensing module transmitted the determined pressure to the pressure reader module. In further exemplary arrangements, the pressure reader module 108 may receive the data transmitted by the sensing module and transmit the data to a further apparatus. Alternatively, the sensing modules 104*a-f* may be configured to transmit the data to the further apparatus upon activation by the pressure reader module 108.

Figure 6:
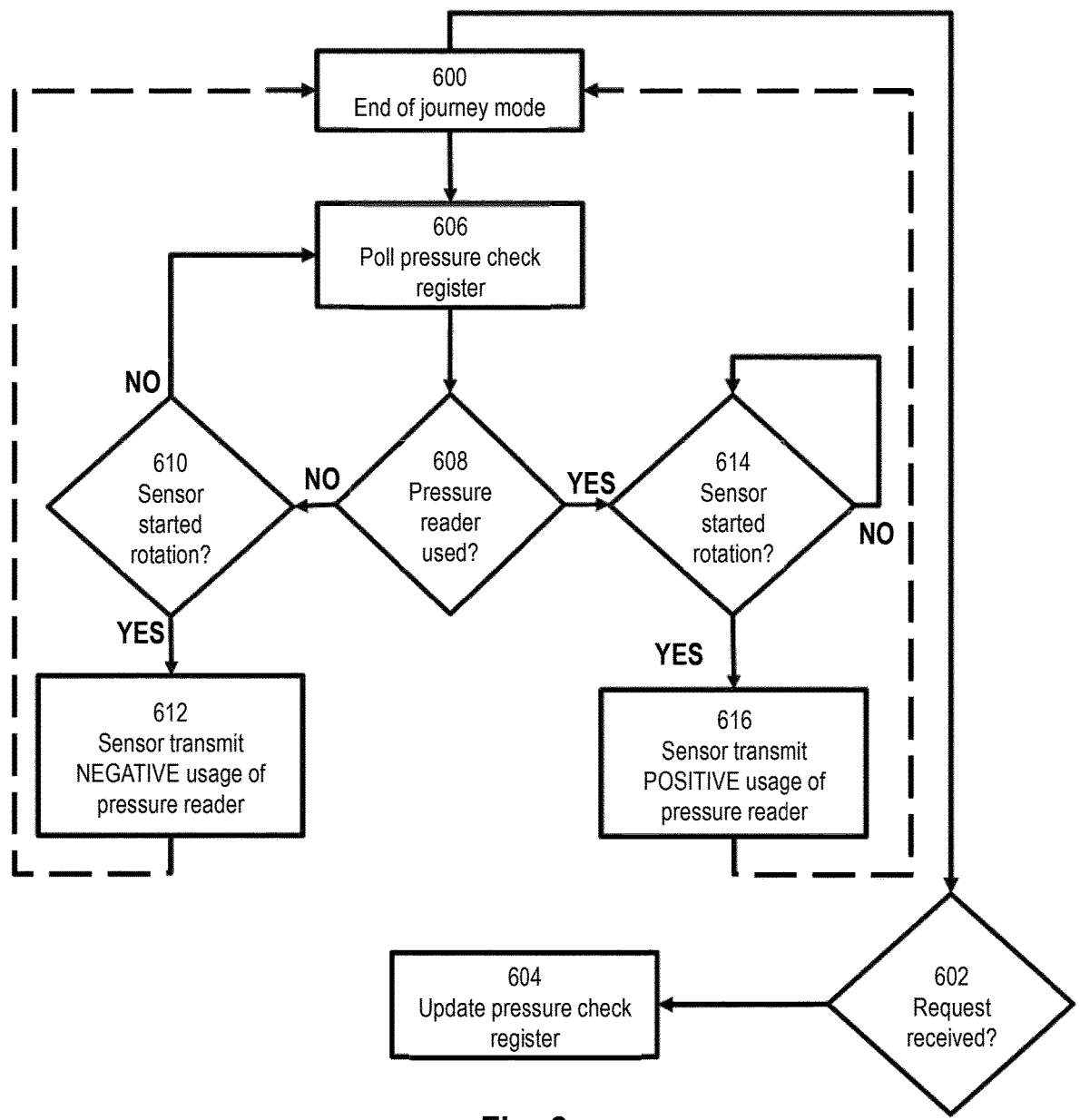
FIG. 6 shows a process flow diagram showing a method for confirming a check of tyre pressures of a vehicle.

FIG. 6 shows a flow diagram of a method for confirming a tyre pressure check has been carried out on a single sensing module 104*a-f*.

The sensing module 104*a-f* is in "journey end" mode 600. This mode may be construed broadly to mean that the sensing module 104*a-f* is awaiting the start of a new journey.

In some arrangements, the journey end mode of the sensing module 104*a-f* may encompass a sleep mode that is initiated a certain period of time after the motion sensor 224 stops detecting motion.

In the journey end mode 600, the pressure check register 228 indicates that the pressure reader module 108 has not been used. The pressure check register 228 may be cleared when the sensing module 104*a-f* is in journey end mode, such that it indicates no usage of the pressure reader module 108.

The sensing module 104*a-f* determines whether a request for tyre pressure data has been received 602 by the receiver 204. If so, the pressure check register 228 is updated 604.

The pressure check register 228 is polled 606 and it is determined 608 whether the pressure check register 228 indicates that a request for tyre pressure data has been received. Updating the pressure check register 228 comprises storing data indicating that a request for tyre pressure data has been received from the pressure reader module 108. The pressure reader module 108 is configured to transmit a request for tyre pressure data to the sensing module 104*a-f* when it is used. The request is received by the receiver 204. The pressure check register 228 stores data indicating that such a request has been received. This may be an indication that the pressure reader 108 has been used on that sensing module 104*a-f*. Therefore, each time the pressure check register 228 is polled, if data indicating that a request for tyre pressure data has been received then it can be inferred that the pressure reader module has been used and the tyre pressure check has been carried out.

The pressure check register 228 may be polled 606 at regular (or irregular) intervals to determine whether the pressure reader 108 has been used. Alternatively, the pressure check register 228 may be read based on an event, such as the updating of the pressure check register 224. In such arrangements, steps 610 and/or 614 may be begun after step 604.

If after polling the pressure check register 228 indicates 608 that no request for tyre pressure data has been received, the motion sensor 224 determines whether the wheel to which the sensing module 104*a-f* is fitted has begun to rotate and/or is rotating 610.

If the motion sensor 224 determines that the wheel has not begun to rotate and/or is not rotating then the pressure check register 228 is polled again 606. If the motion sensor 224 determines that the wheel has begun to rotate and/or is rotating then the transmitter 202 transmits 612 a negative indication to the further apparatus, which may be a driver indicator unit 102. The negative indication specifies that the tyre pressure was not checked before the journey of the vehicle began.

If after polling the pressure check register 228 indicates 608 that a request for tyre pressure data has been received, the motion sensor 224 determines whether the wheel to which the sensing module 104*a-f* is fitted has begun to rotate and/or is rotating 614.

If the motion sensor 224 determines that the wheel has not begun to rotate and/or is not rotating then the sensing module 104*a-f* waits until rotation of the wheel is detected. It may be unnecessary to poll the pressure check register 228 again once it has been updated. If the motion sensor 224 determines that the wheel has begun to rotate and/or is rotating then the transmitter 202 transmits 612 a positive indication to the further apparatus. The positive indication specifies that the tyre pressure was checked before the journey of the vehicle began.

The above process may be repeated on a plurality of sensing modules 104a-f fitted to the vehicle 100. In some arrangements, sensing modules 104a-f may be fitted to all wheels.

The further apparatus, which may be the driver indicator unit 102 may be configured to receive at the receiver 304 the positive and/or negative indications from the sensing modules 104a-f. Based on the received indications, the pressure check confirmer 318 is configured to determine whether a vehicle tyre pressure check has been carried out. A vehicle tyre pressure check may be considered to have been carried out when a plurality of individual tyre pressure checks have been carried out, and therefore when a plurality of positive indications have been received.

The plurality of positive indications may include positive indications from all sensing modules 104a-f fitted to the vehicle 100. Alternatively, the plurality of positive indications may include positive indications from selected sensing modules, such as at least one sensing module at each corner of the vehicle 100, at least one sensing module at the front and/or rear of the vehicle 100, at least two sensing modules, or at least percentage of the sensing modules fitted to the vehicle 100, say at least 50%, at least 70% or at least 90%. This may be sufficient to indicate that a walk-around check has been carried out.

The driver indicator unit 102 may display an indication to a driver of the vehicle 100 whether a walk-around check or vehicle tyre pressure check has been carried out. This may comprise a warning, which may be visual and/or audible. In some exemplary arrangements, the driver indicator unit 102 may transmit the indication of whether the vehicle tyre pressure check and/or the walk-around check has been conducted to a central server. The central server may therefore comprise data specifying a log of vehicle tyre pressure checks and/or walk-around checks for the vehicle 100. This data may be accessed by a user to monitor vehicle checks and may be cross referenced with journey data.

The above arrangements provide methods and apparatus for having greater confidence that a vehicle tyre pressure check and/or walk-around check has been carried out. Non-conformance to such checks is a major issue for fleet vehicle operators and has direct implications for vehicle maintenance and safety.

In some arrangements, the further apparatus (e.g. the driver indicator unit 102) may be configured to immobilise the engine, motor or other drivetrain of the vehicle 100 in dependence on the receipt of the plurality of indications from the sensing modules 104a-f. That is, if positive indications are not received from the plurality (which may or may not be all) of the sensing modules 104a-f then the driver may be prevented from beginning a journey.

In an arrangement, the pressure reader module 108 may be configured to receive data from the tyre pressure sensing module 104a-f after a pressure check has been initiated. In such arrangements, the pressure reader module 108 may comprise a pressure check register to store an indication that the pressure check has taken place. The pressure reader module 108 may comprise a transmitter to transmit data stored in the pressure check register to a server located within a telecommunications network. This may be done via a network connected device, such as a user equipment, e.g. a mobile phone or similar, which is configured to receive the data and upload it to the server. The server and/or the pressure reader module 108 may also comprise a pressure check confirmer configured in a similar fashion to that described elsewhere herein.

In other exemplary arrangements, a user module 108, which need not be a pressure reader module, may be configured to transmit data to a tyre pressure sensing module 104a-f indicating that it is within a range of the tyre pressure sending module 104a-f. The range may be any of less than 50 cm away from the tyre pressure sensor, less than 25 cm away from the tyre pressure sensor, less than 10 cm away from the tyre pressure sensor, less than 5 cm away from the tyre pressure sensor or less than 2 cm away from the tyre pressure sensor.

In such arrangements, the transmitter 202 of the tyre pressure sensing module 104a-f may be configured to transmit tyre pressure data that is indicative of the tyre pressure to an apparatus and optionally not to the user module 108. The apparatus may be a driver indicator unit 102 or a user equipment, such as a mobile phone or other device.

In each case, there is no explicit need for the user module 108 to conduct a pressure check per se. This may be because the tyre pressure sensing module 104a-f is capable of transmitting that data directly to the apparatus (e.g. driver indicator unit 102). However, the fact that a user module 108 has been within range of one or more tyre pressure sensor modules 104a-f may be used as an indication that the user was also at that location and therefore be a proxy for indicating that a walk-around check has been undertaken.

The driver indicator unit 102 or user equipment may receive data from one or more tyre pressure sensing modules 104a-f indicating that the user module 108 has been within range. The walk-around check confirmer 318 stores data indicating that the user module 108 has been within range and may be configured to confirm whether a walk-around has been undertaken based on the data received from the tyre pressure sensing modules 104a-f. The transmitter 302 may be configured to upload data indicating whether a walk-around has been undertaken to a server.

The user module or pressure reader module 108 may communicate with the tyre pressure sensing module using NFC or similar and may communicate with the user equipment using Bluetooth® or similar, for example. This may particularly be the case in arrangements where the apparatus comprises a user equipment. The user equipment may be configured to upload data indicating whether a walk-around has been undertaken to a server.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A tyre pressure sensing module for fitting to a wheel of a vehicle comprising a pneumatic tyre, the tyre pressure sensing module comprising:
   a tyre pressure sensor for sensing a pressure of a gas retained within a pneumatic tyre and comprising a pressure check register configured to store data indicating that a request for type pressure data has been received;
   a receiver configured to receive, from a pressure reader module of a user module, data comprising the request for tyre pressure data indicative of the pressure of the gas retained within the pneumatic tyre and indicating that the user module is proximal to the tyre pressure sensor; and
   a transmitter configured to transmit to an apparatus, data comprising an indication confirming whether a tyre pressure check has been carried out based on whether the request for tyre pressure data was received, wherein receipt of the request for tyre pressure data indicates that the user module has been proximal to the tyre pressure sensor.

2. The tyre pressure sensing module according to claim 1, wherein:
   the user module is proximal to the tyre pressure sensor when the user module is less than 50 cm away from the tyre pressure sensor; and
   the receiver is configured not to determine that the user module is proximal to the tyre pressure sensor when the user module is 50 cm or more away from the tyre pressure sensor.

3. The tyre pressure sensing module according to claim 1, wherein the transmitter is further configured to transmit the requested tyre pressure data to the pressure reader module included in the user module.

4. The tyre pressure sensing module according to claim 1, the tyre pressure sensing module further configured to poll the pressure check register to determine whether tyre pressure data has been requested.

5. The tyre pressure sensing module according to claim 1, further comprising a motion sensor configured to determine whether the wheel is rotating.

6. The tyre pressure sensing module according to claim 5, wherein the transmitter is configured to transmit the indication that the user module has been proximal to the tyre pressure sensor based on the motion sensor determining that the wheel is rotating.

7. The tyre pressure sensing module according to claim 1, wherein:
   the transmitter is configured to send a positive indication that the pressure reader module has been used if the request for tyre pressure data was received from the pressure reader module, and
   the transmitter is configured to send a negative indication that the pressure reader module has been used if the receiver has not received the request for tyre pressure data from the pressure reader module.

8. The tyre pressure sensing module according to claim 1, wherein the transmitter is further configured to transmit, to the apparatus, tyre pressure data indicative of the pressure of the gas retained within the pneumatic tyre.

9. The tyre pressure sensing module according to claim 1, wherein:
   the apparatus comprises the user module; and
   the transmitted data indicating that the user module has been proximal to the tyre pressure sensor is configured to be forwarded to a further apparatus.

10. The tyre pressure sensing module as claim 1 recites, wherein the tyre pressure sensing module is configured to be fit, at least in part, directly to the wheel of a vehicle comprising the pneumatic tyre.

11. The tyre pressure sensing module as claim 1 recites, wherein the indication that the user module is proximal to the tyre pressure sensor indicates when the user module is within a predetermined distance of the tyre pressure sensor.

12. The tyre pressure sensing module as claim 1 recites, the user module configured for use with a plurality of different tyre pressure sensing modules from a plurality of vendors.

13. The tyre pressure sensing module according to claim 1, wherein:
   the receiver is configured to determine that the user module is proximal to the tyre pressure sensor when the user module is less than 25 cm away from the tyre pressure sensor; and
   the receiver is configured not to determine that the user module is proximal to the tyre pressure sensor when the user module is 25 cm or more away from the tyre pressure sensor.

14. The tyre pressure sensing module according to claim 1, wherein:
   the receiver is configured to determine that the user module is proximal to the tyre pressure sensor when the user module is less than 10 cm away from the tyre pressure sensor; and
   the receiver is configured not to determine that the user module is proximal to the tyre pressure sensor when the user module is 10 cm or more away from the tyre pressure sensor.

15. The tyre pressure sensing module according to claim 1, wherein:
   the receiver is configured to determine that the user module is proximal to the tyre pressure sensor when the user module is less than 5 cm away from the tyre pressure sensor; and
   the receiver is configured not to determine that the user module is proximal to the tyre pressure sensor when the user module is 5 cm or more away from the tyre pressure sensor.

16. The tyre pressure sensing module according to claim 1, wherein:
   the receiver is configured to determine that the user module is proximal to the tyre pressure sensor when the user module is less than 2 cm away from the tyre pressure sensor; and
   the receiver is configured not to determine that the user module is proximal to the tyre pressure sensor when the user module is 2 cm or more away from the tyre pressure sensor.

17. The tyre pressure sensing module according to claim 1, further comprising:
   wherein:
      second data indicating that the request for the tyre pressure data has been received by the receiver is stored in the pressure check register in response to receipt of the request for tyre pressure data from the pressure reader module; and
   the transmitter is further configured to transmit to the apparatus, data further including an indication that the user module has been proximal to the tyre pressure sensor in the event that data including an indication that a request for the tyre pressure data has been received is stored within the pressure check register.

* * * * *